United States Patent
Leonard

(12) United States Patent (10) Patent No.: US 6,172,830 B1
(45) Date of Patent: Jan. 9, 2001

(54) METHOD AND APPARATUS FOR WRITING A CLOCK TRACK ON A STORAGE MEDIUM

(75) Inventor: Anthony W. Leonard, Rowlands Castle (GB)

(73) Assignee: Havant International Ltd., Havant (DE)

( * ) Notice: Under 35 U.S.C. 154(b), the term of this patent shall be extended for 0 days.

(21) Appl. No.: 09/345,757

(22) Filed: Jul. 1, 1999

Related U.S. Application Data

(63) Continuation of application No. PCT/GB98/00012, filed on Jan. 5, 1998.

(30) Foreign Application Priority Data

Jan. 6, 1997 (GB) .................................................. 9700117

(51) Int. Cl.⁷ .............................. G11B 5/09; G11B 21/02
(52) U.S. Cl. ............................................. 360/51; 360/75
(58) Field of Search .................. 360/51, 39, 75

(56) References Cited

U.S. PATENT DOCUMENTS

| | | |
|---|---|---|
| 3,099,822 | 7/1963 | Williams . |
| 4,414,589 | 11/1983 | Oliver et al. . |
| 4,757,406 | 7/1988 | Stewart et al. . |
| 4,996,608 | 2/1991 | Widney . |
| 5,333,140 | 7/1994 | Moraru et al. . |
| 5,448,429 | 9/1995 | Cribbs et al. . |
| 5,485,322 | 1/1996 | Chainer et al. . |
| 5,668,679 | 9/1997 | Swearingen et al. . |

FOREIGN PATENT DOCUMENTS 0 546 227    6/1993 (EP) .

OTHER PUBLICATIONS

"Regenerative Clock Technique For Servo Track Writers, " IBM Technical Disclosure Bulletin, vol. 33, No. 5, Oct. 1, 1990, Armonk, NY, US, p. 310/311.

*Primary Examiner*—W. Chris Kim
(74) *Attorney, Agent, or Firm*—Pillsbury, Madison & Sutro Intellectual Property Group

(57) ABSTRACT

A method and apparatus for writing clock data to a storage medium, such as a disk, is disclosed. The storage medium has tracks on which data are stored. Clock data is written to a present track on the storage medium. The written clock data is read from said present track. Clock data for a subsequent track on the storage medium is generated from the clock data read from said present track. The phase of the generated clock data for the subsequent track is compared with a reference timing signal and the phase of the generated clock data for the subsequent track is adjusted in accordance with said comparison. Said phase adjusted clock data for the subsequent track is written to said subsequent track. Phase errors can be significantly reduced and, for practical purposes, substantially eliminated. It is not necessary to provide a dedicated clock read/write head.

28 Claims, 8 Drawing Sheets

Plurality of external reference transitions per disk revolution

Time representing one revolution of disk

Histograms representing jitter on each external reference transition

Nominal occurrences of external reference transitions in time domain

Instantaneous occurrences of external reference transitions in time domain

METHOD AND APPARATUS FOR WRITING A CLOCK TRACK ON A STORAGE MEDIUM

This application is a continuation of PCT/GB89/00012 filed Jan. 5, 1998.

The present invention relates to a method and apparatus for writing a clock track on a storage medium.

Information for systems such as data processing systems is typically stored on storage media. Particular use is made of storage disks such as magnetic disks, opto-magnetic disks, and the like. One type of magnetic disk is a so-called "hard disk assembly" which is intended normally to be permanently fixed in a data processing system; the hard disk assembly includes the magnetic disk medium itself and the associated read and write head or heads which write data to the disk and read data from the disk. Another type of magnetic disk is of a type known as "removable media" which normally consists of a magnetic disk medium in a protective plastics case which can be used to transfer data between data processing systems by physical transfer of the disk itself from one machine to another.

In manufacturing storage media such as hard disk drives, a hard disk assembly consisting of the head(s), the disk or disks, the motor and arm electronics, is mounted in a mastering station known as a servo-writer. The servo-writer writes a pattern of magnetic information (the "servo track pattern") onto the disk. The servo track pattern becomes the master reference which is used by the disk drive during normal operation in order to locate the tracks and sectors on the disk for data storage and retrieval.

In order to be able to write the servo track onto the correct positions on the disk during manufacture of the disk, it is necessary to write a (usually temporary) clock track onto the disk which serves as a timing reference during writing of the servo pattern. Conventionally, a separate clock head is used to write the clock track onto the disk. However, the use of a dedicated clock track writing head is an expensive addition to the manufacturing process.

U.S. Pat. No. 5,485,322 discloses a method and system for writing a clock track on a storage medium using an internal recording head of a hard disk drive. A timing pattern is generated on the storage medium with the internal recording head and a radial positioning value used in radially positioning the internal recording head is determined. The servo pattern is written at the locations determined by the generated timing pattern and radial positioning value. In effect, in this prior art system, the clock pattern is written in an iterative manner across the disk. However, there is a problem in that this method can introduce phase differences in a clock pattern between respective tracks on the disk. As a disk will often require many thousands of clock tracks across the disk, even very small phase errors in the clock track can cumulatively become very large.

U.S. Pat. No. 5,448,429 discloses another example of a system for writing clock tracks across a disk in which a written clock signal is read to provide a reference for the writing of the clock signal to a subsequent track.

According to a first aspect of the present invention, there is provided a method of writing clock data to a storage medium having tracks on which data are stored, the method comprising the steps of:

(A) writing clock data to a present track on the storage medium;

(B) reading said written clock data from said present track;

(C) generating clock data for a subsequent track on the storage medium from the clock data read from said present track;

(D) comparing the phase of the generated clock data for the subsequent track with a reference timing signal and adjusting the phase of the generated clock data for the subsequent track in accordance with said comparison; and, (E) writing said phase adjusted clock data for the subsequent track to said subsequent track.

The use of the reference timing signal means that phase errors, arising for example from variations in the phase owing to various effects (such as propagation delays in the write circuit, the magnetic effects of writing the transitions to the disk and reading the transitions from the disk within the magnetic head, and the read channel and decode circuitry) can be significantly reduced and, for practical purposes, substantially eliminated. It is not necessary to provide a dedicated clock read/write head as required in some prior art systems.

The subsequent track may be the track immediately following the present track.

The steps (B) to (E) may be repeated across the tracks on the storage medium, with the clock data read from a certain track in a step (B) being the clock data written in a step (E) for that track. Thus, the clock data for a track is generated from the phase corrected clock data read from a previous track, the phase adjustment being made in accordance with the reference timing signal.

Steps (B) to (E) can be repeated for every track on the storage medium. Alternatively, phase adjustment may only have to be carried out for some of the tracks, such as every second or every third track.

In the comparison step (D), the phase of the generated clock data to be written to a present track may be adjusted by an amount which takes into account the phase adjustment used for clock data written to a previous track, the phase difference between the reference timing signal and the generated clock data to be written to the present track, and the phase difference between the reference timing signal and the generated clock data to be written to said previous track.

In a particularly preferred embodiment, in the comparison step (D), the phase of the generated clock data to be written to a present track n is adjusted by an amount $T(n)$ substantially equal to $(T(n-1)-2T_{error}(n)+T_{error}(n-1))$, where $T(n-1)$ is the phase adjustment used for clock data written to the previous track $n-1$, $T_{error}(n)$ is the phase difference between the reference timing signal and the generated clock data to be written to the present track n, and $T_{error}(n-1)$ is the phase difference between the reference timing signal and the generated clock data to be written to the previous track $n-1$.

Said previous track may be the track which immediately precedes the present track.

The storage medium may be a disk.

The disk may be a magnetic disk.

The disk may have a motor for rotating the disk. Conveniently, the timing reference signal may be obtained from the back emf (electromotive force) of said rotating motor.

Alternatively or additionally, the timing reference signal may be obtained from a probe which detects movement past the probe of an index or indices on a rotating part of a disk drive which includes a disk as a storage medium during rotation of the disk. The index may be an optically detectable mark on the disk and the probe may be an optical sensor.

Alternatively or additionally, the probe may be a non-contact inductive probe which detects movement therepast of features on a rotating part of a disk drive. Such features may be screws on the hub associated with the rotating part of the disk drive. A suitable non-contact inductive probe is a Hall effect probe.

The timing reference signal actually used may be a statistical average in the time domain of a plurality of such timing reference signals. This serves to reduce the problem of variations in the timing reference signal which may occur. The average may be taken over several clock track copying cycles.

According to a second aspect of the present invention, there is provided apparatus for writing clock data to a storage medium having tracks on which data are stored, the apparatus comprising:

writing means for writing clock data to a present track on a storage medium;

reading means for reading said written clock data from said present track;

generating means for generating clock data for a subsequent track on the storage medium from the clock data read from said present track;

comparing and adjusting means for comparing the phase of the generated clock data for the subsequent track with a reference timing signal and adjusting the phase of the generated clock data for the subsequent track in accordance with said comparison; and, means for writing said phase adjusted clock data for the subsequent track to said subsequent track.

The comparison and adjusting means may include means for adjusting the phase of the generated clock data to be written to a present track by an amount which takes into account the phase adjustment used for clock data written to a previous track, the phase difference between the reference timing signal and the generated clock data to be written to the present track, and the phase difference between the reference timing signal and the generated clock data to be written to said previous track.

In a particularly preferred embodiment, the comparison and adjusting means may include means for adjusting the phase of the generated clock data to be written to a present track n by an amount $T(n)$ substantially equal to $(T(n-1)-2T_{error}(n)+T_{error}(n-1))$, where $T(n-1)$ is the phase adjustment used for clock data written to the previous track $n-1$, $T_{error}(n)$ is the phase difference between the reference timing signal and the generated clock data to be written to the present track n, and $T_{error}(n-1)$ is the phase difference between the reference timing signal and the generated clock data to be written to the previous track $n-1$.

The apparatus may include means for generating a reference timing signal.

The apparatus may include a disk storage medium.

The disk may be a magnetic disk.

The disk may have a motor for rotating the disk. Conveniently, the timing reference signal may be obtained from the back emf (electromotive force) of said rotating motor.

Alternatively or additionally, the timing reference signal may be obtained from a probe which detects movement past the probe of an index or indices on a rotating part of a disk drive during rotation of the disk. The index may be an optically detectable mark on the disk and the probe may be an optical sensor. Alternatively or additionally, a Hall effect probe or other non-contact inductive probe may detect movement therepast of features on a rotating part of a disk drive. Such features may be screws associated with the rotating part of the disk drive.

The timing reference signal actually used may be a statistical average in the time domain of a plurality of such timing reference signals. This serves to reduce the problem of variations in the timing reference signal which may occur. The average may be taken over several clock track copying cycles.

Embodiments of the present invention will now be described by way of example with reference to the accompanying drawings, in which.

Figure 6:
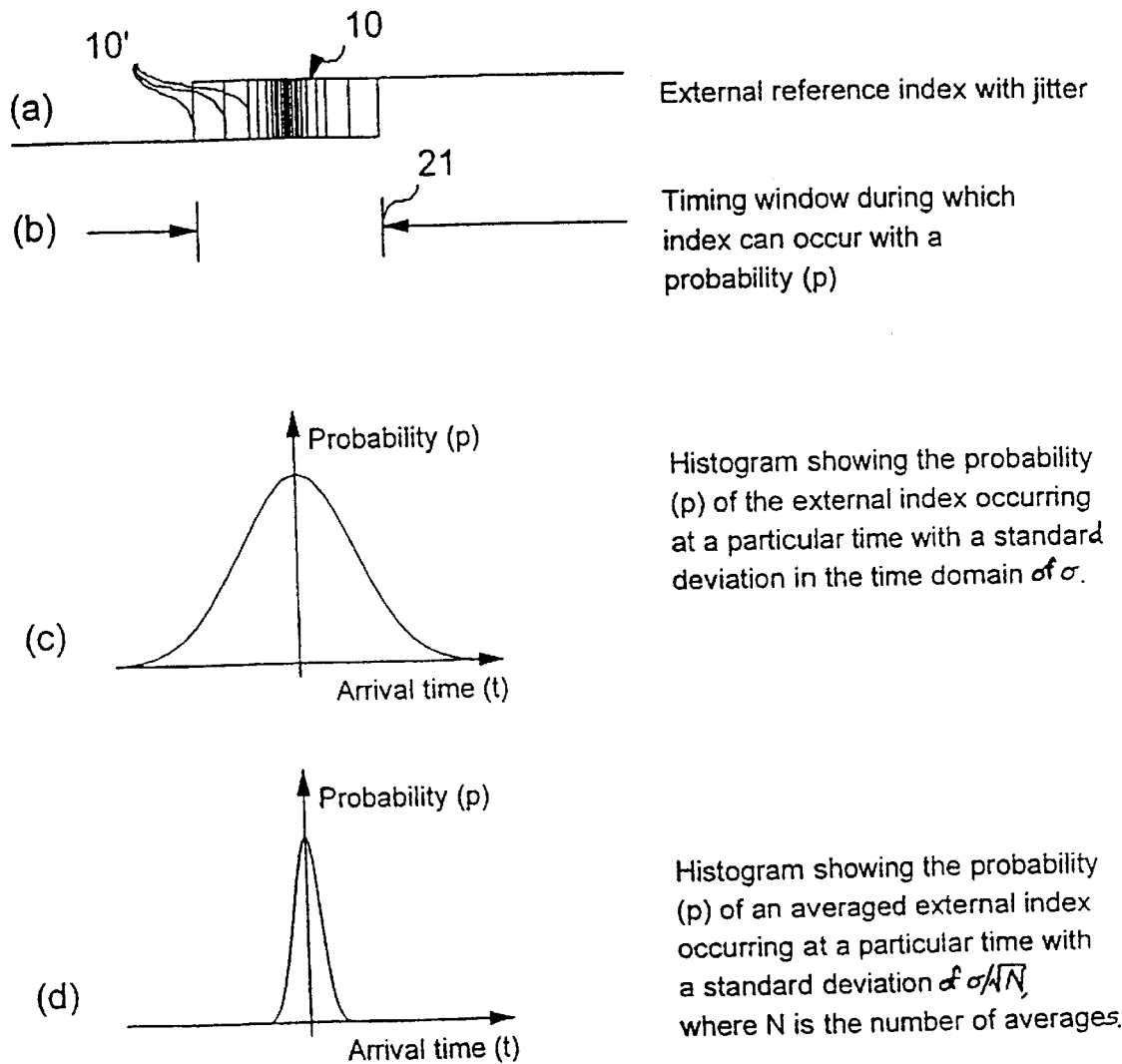
Figure 7:
Figure 7:
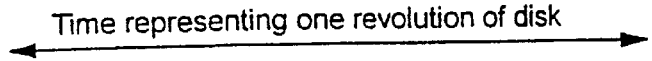
Figure 7:
Figure 7:
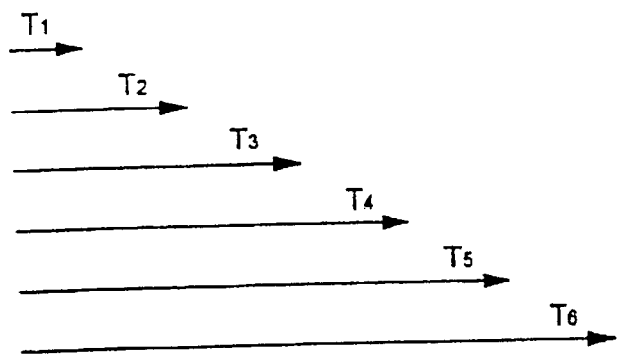
Figure 7:
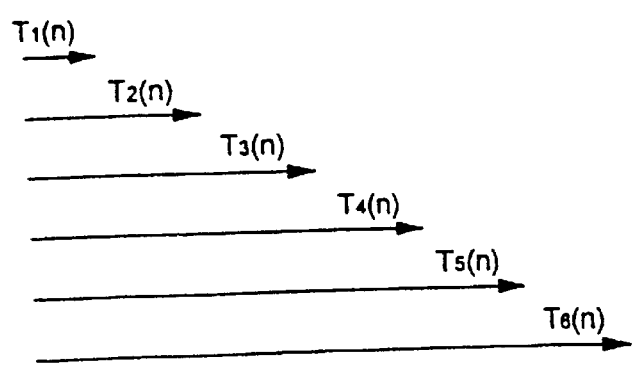
Figure 8:
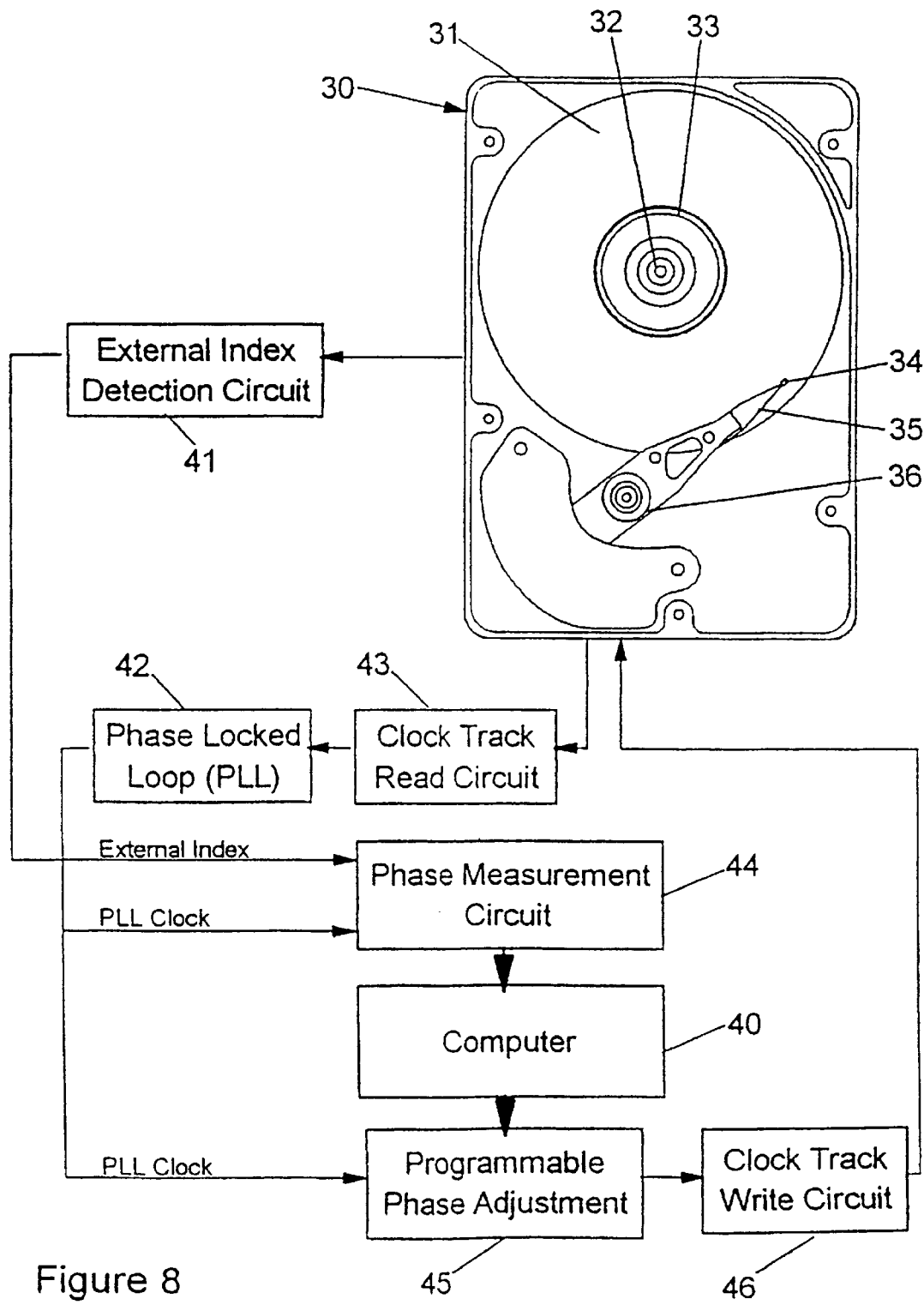

FIG. 6 schematically shows how jitter in the timing reference may be eliminated or substantially reduced;

FIG. 7 is a schematic drawing for explaining the use of plural reference indices; and, FIG. 8 is a schematic drawing of a hard disk drive and apparatus according to the present invention.

Figure 1:
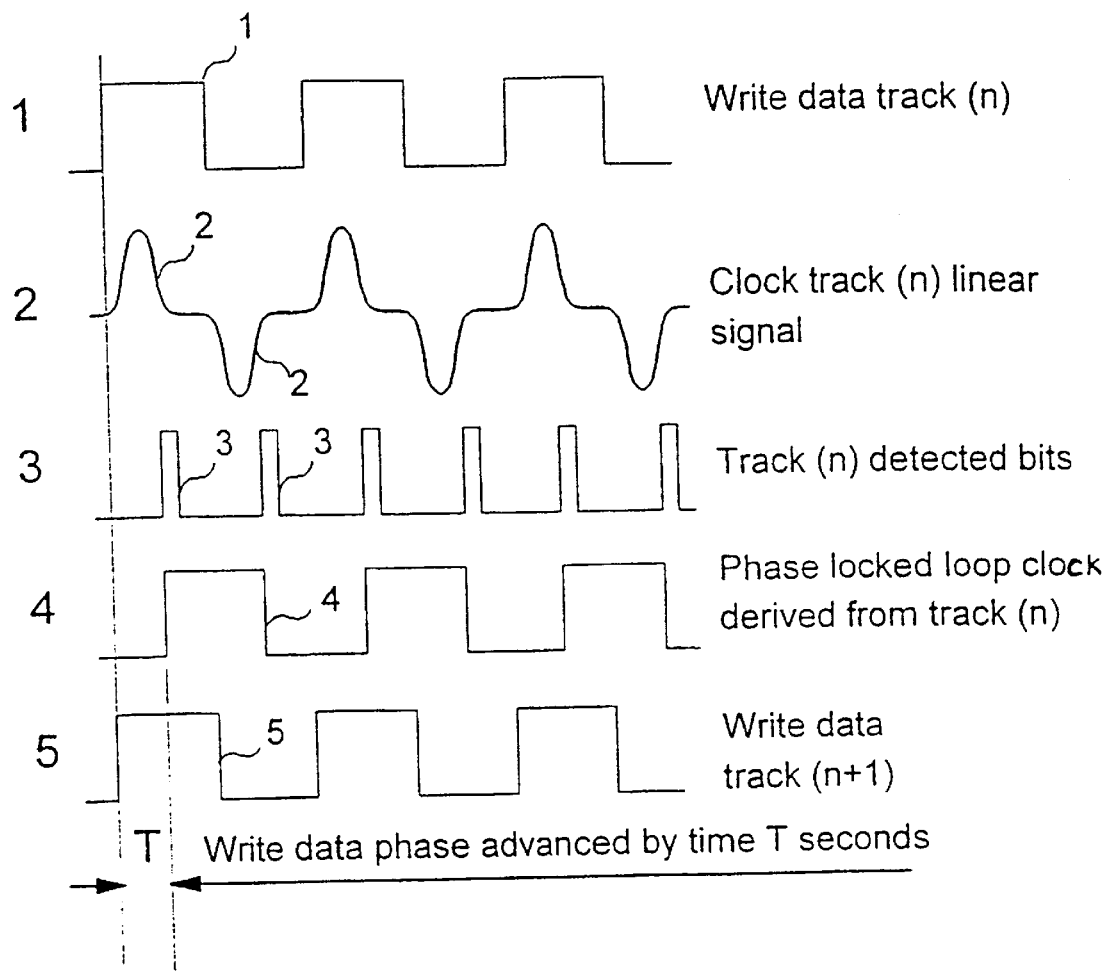
FIG. 1 is a schematic representation of a prior art scheme for copying clock track data across the surface of a disk.

In FIG. 1, in step 1, a magnetic clock pattern (the "write data track") for one track n of a magnetic disk is written to that track n. The clock track pattern which is written is for example a square wave 1 as shown in step 1 of FIG. 1.

The clock track just written to track n is then read back in step 2. The pattern which is actually written to the disk is a series of pulses 2 of information on the disk known as the "linear head signal". These pulses 2 are decoded for example into peak detected bits 3 for track n as shown in step 3 of FIG. 1. Those skilled in the art will appreciate that other decoding schemes for decoding the pulses 2 of the clock data for track n can be used.

In this prior art scheme, the clock data (the "phase locked loop clock") 4 for the next track n+1 shown in step 4 of FIG. 1 is obtained from the peak detected bits 3 for track n shown in step 3 of FIG. 1. As can be clearly seen from a comparison of the clock data patterns in steps 1 and 4, the clock data 4 for track n+1 is delayed by a time T relative to the clock data 1 for track n. Thus, when actually writing the clock data pattern to track n+1, it is necessary to advance the phase of the clock data obtained in step 4 by a time T so that the clock data 5 (the write data track) for track n+1 shown in step 5 of FIG. 1 is in phase with the clock data 1 for track n shown in step 1 of FIG. 1.

The delay in phase T relative to the original clock data is induced by several effects in the manufacturing process such as propagation delays in the write circuit, the magnetic effects of writing the transitions to the disk and reading the transitions from the disk within the magnetic head, and the read channel and decode circuitry. Some of these effects can produce a phase delay which is variable and which may vary with position of the head across the disk surface and/or with time.

Thus, as the peak detected bits shown in step 3 of FIG. 1 are used by the servo track writer phase locked loop to generate the clock track write data for track n+1, it is necessary in practice to adjust the phase of the write data for track n+1 by a variable time T.

Figure 2:
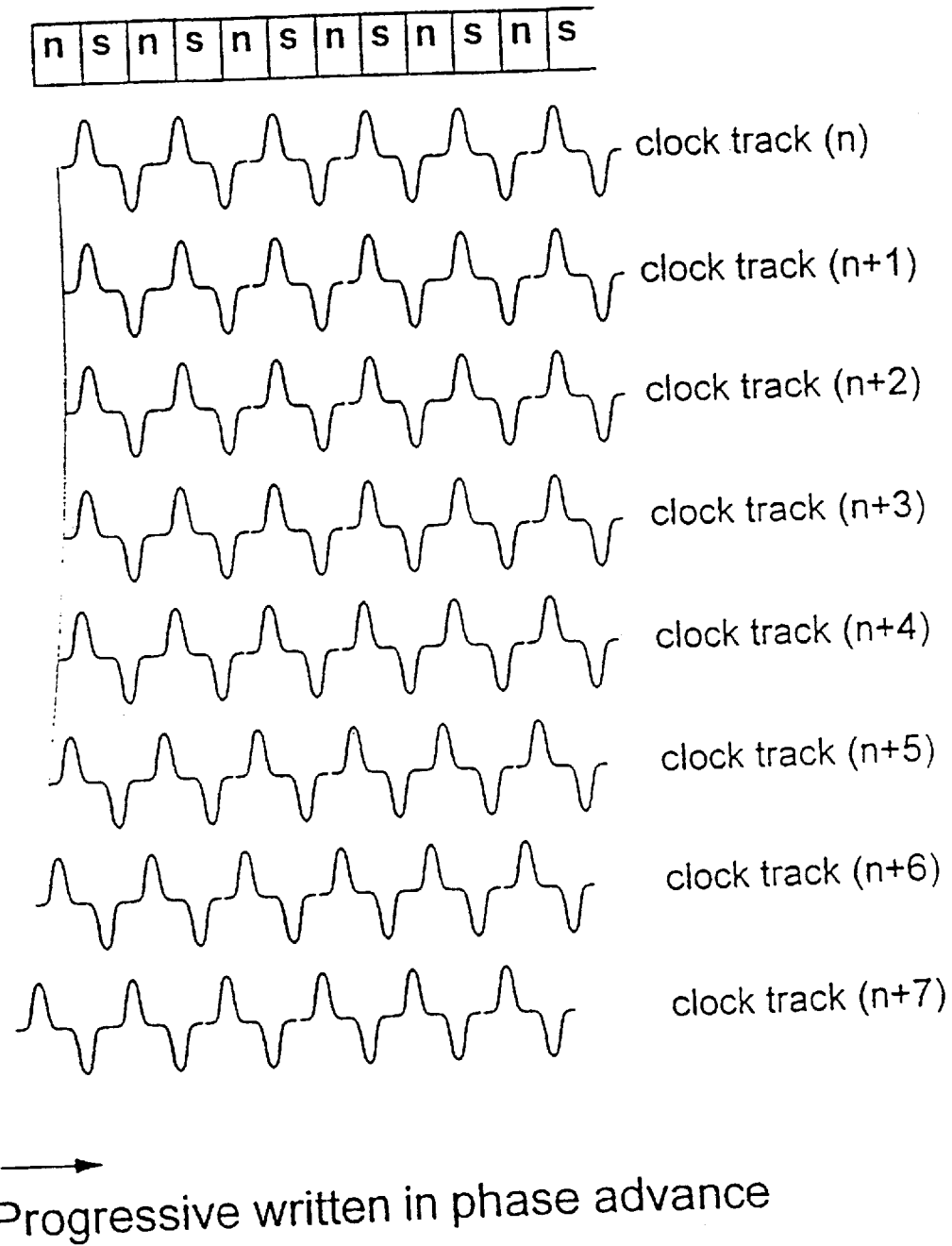
FIG. 2 shows the progressive effect of an excessive phase advance in the clock track copying scheme of FIG. 1.
Figure 3:
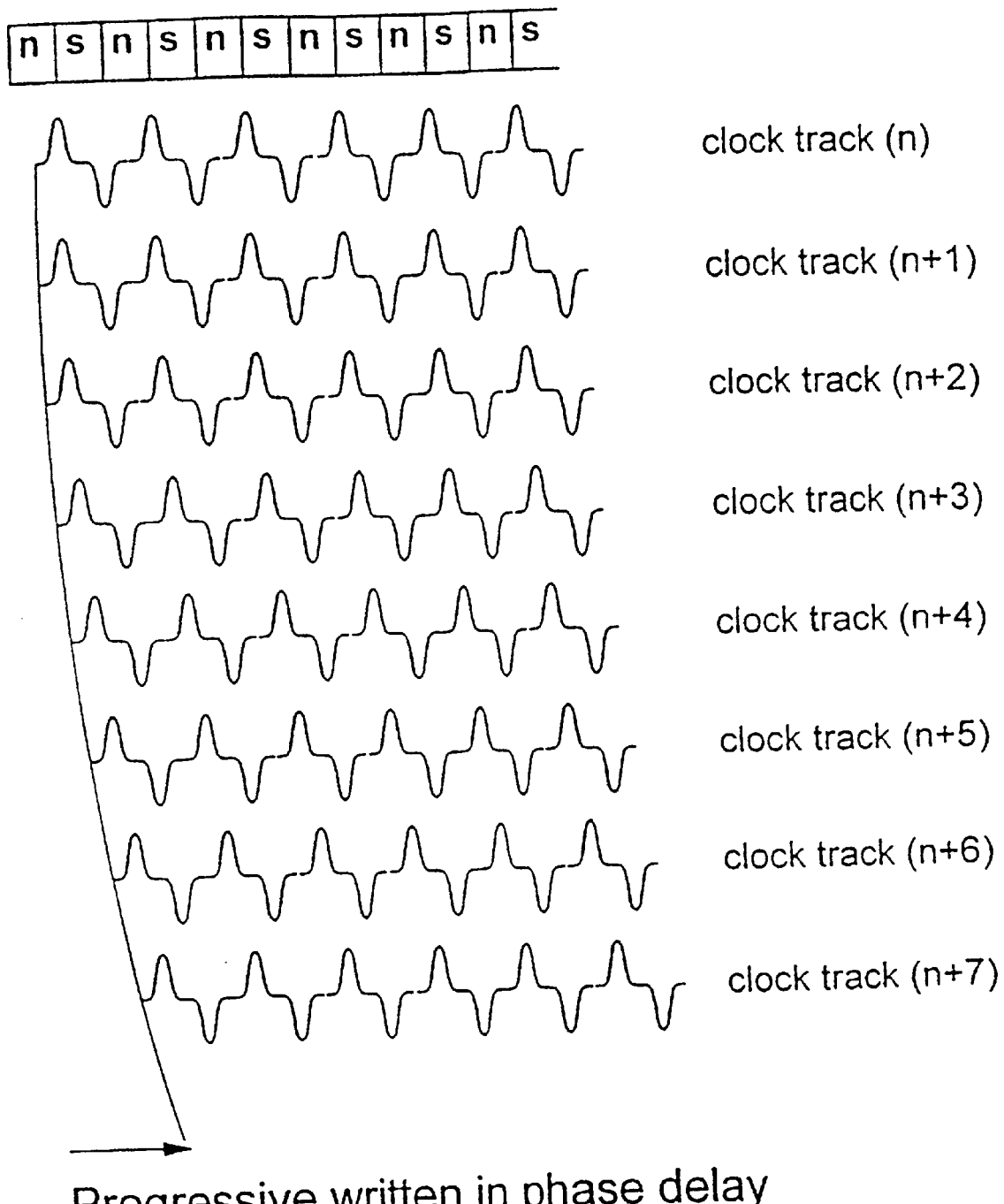
FIG. 3 shows the progressive effect of an insufficient phase advance in the clock track copying scheme of FIG. 1.

If the phase advance time T is too large and subsequently copied tracks become more and more phase advanced relative to track n, the resultant clock patterns across successive tracks is shown in FIG. 2. If the phase advance time T is too small, the clock patterns subsequently copied to the respective sequential tracks become more and more phase delayed relative to track n, the effect of this being shown in FIG. 3. Indeed, the variabilities in the copying process, with the associated effect on the amount of phase difference T relative to track n or the other immediately preceding track can cause a mixture of the above phase advance and delay mechanisms occurring. The clock track data written to successive tracks can effectively "zig zag" across the disk tracks relative to track n.

Figure 4:
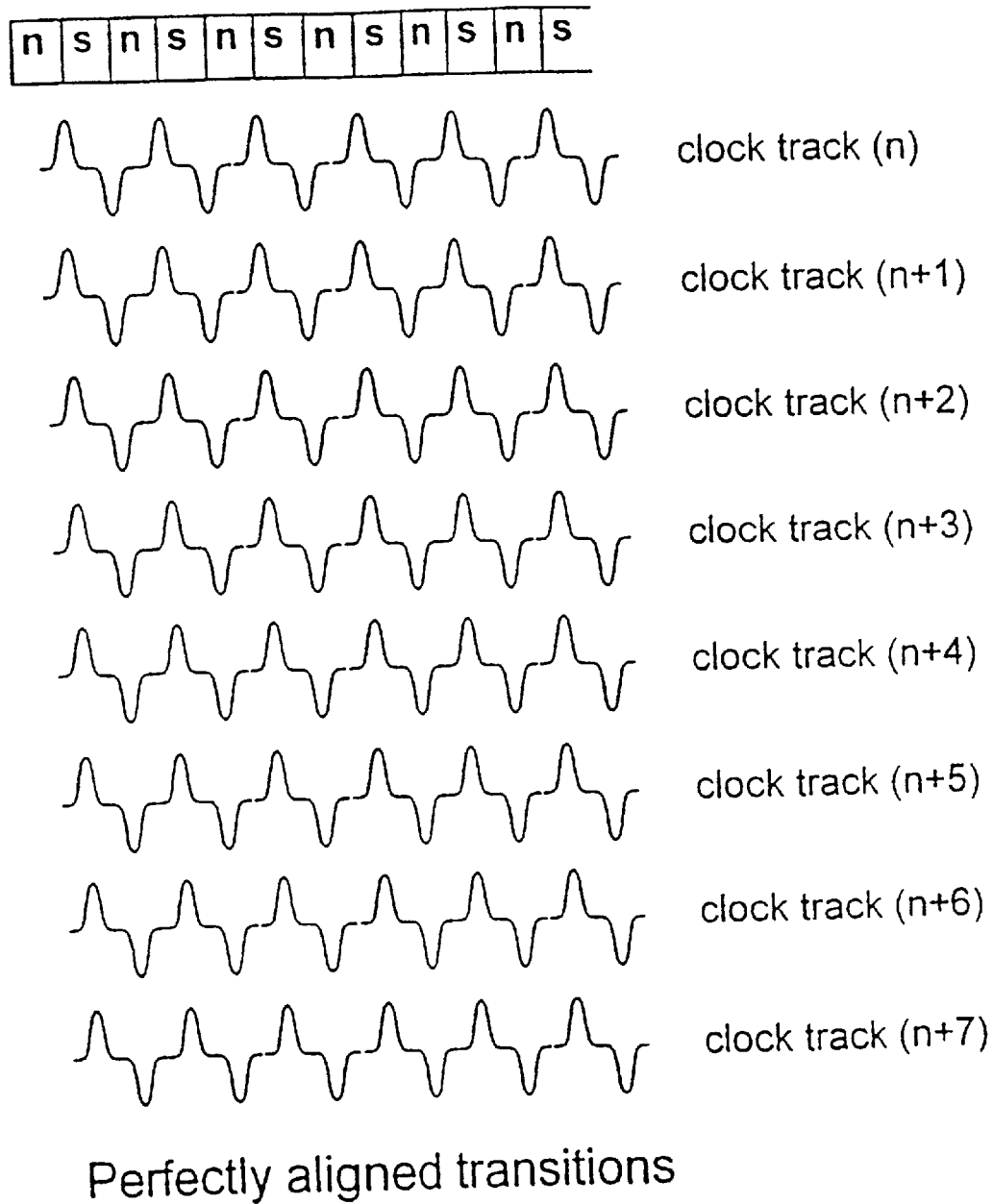
FIG. 4 shows the ideal clock track pattern across adjacent tracks on a disk.

In a servo track write process, all three of the above consequences are highly undesirable as many thousands of clock tracks are required across the disk and even small errors can accumulate and become very large. The ideal clock patterns across successive tracks is shown in FIG. 4 in which the transitions 2 between adjacent tracks are perfectly aligned or aligned to the required tolerance across the surface of the disk.

In order to overcome the variability in the phase T during copying of the clock data between successive tracks, in accordance with the present invention, a timing reference is used to modify the write data phase advance time T during the copying process. The reference which can be used may be for example a back emf (electromotive force) detection circuit provided on the motor which rotates the disk. Alternatively or additionally, an external probe or sensor may detect some feature or features on the rotating part of the disk drive; such feature or features may be a reflector on the rotating part of the disk drive such as the disk itself, the motor spindle, disk clamp, screws on the disk hub, etc. which can be detected optically by the probe. Alternative sensors include a Hall effect sensor or other non-contact inductive probe which can detect features which rotate with the disk.

Figure 5:
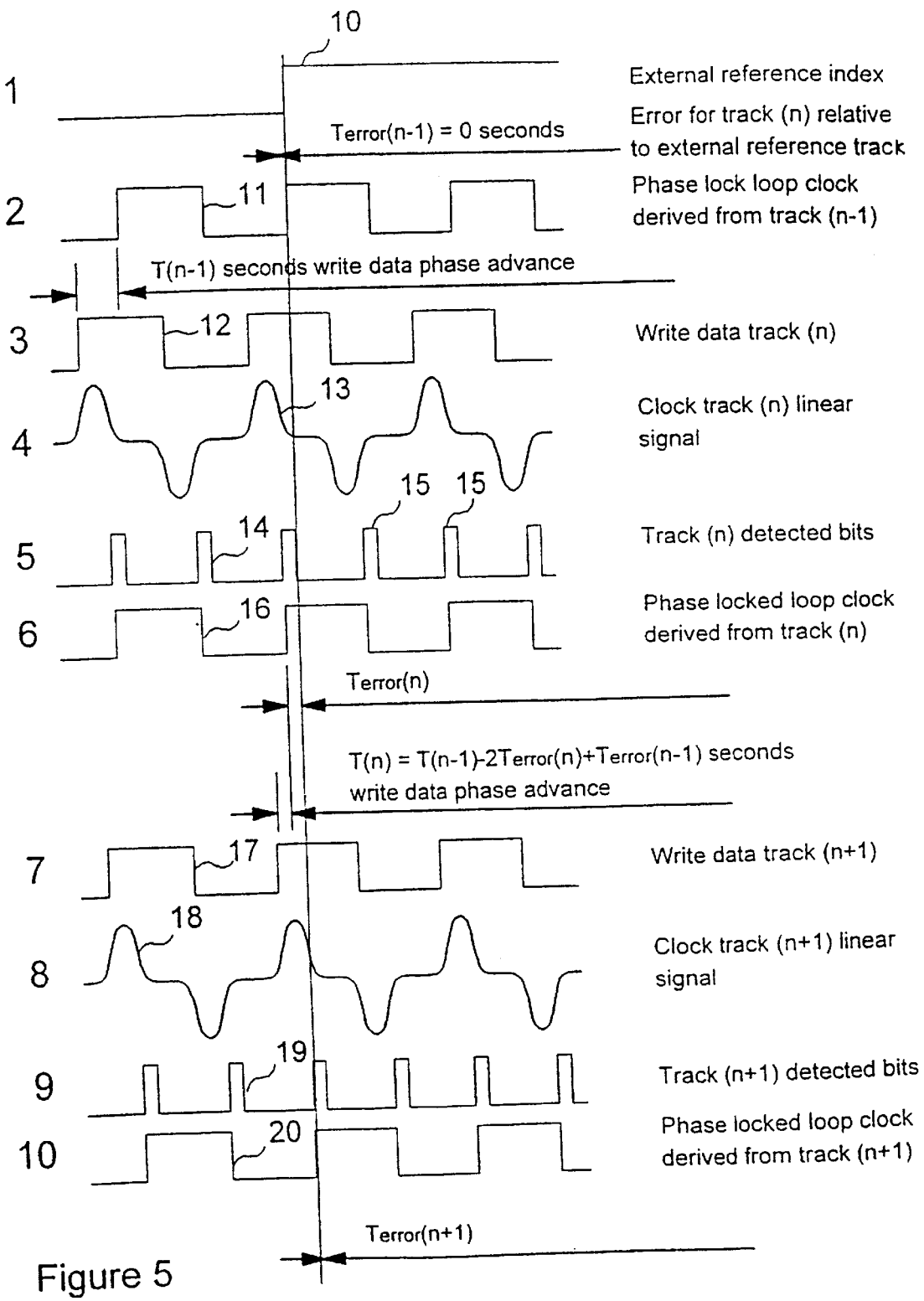
FIG. 5 shows the steps taken by an example of a system of and method according to the present invention which uses a timing reference.

As shown in step 1 FIG. 5, an external reference index 10 is obtained from the timing reference such as the disk motor back emf detection circuit or the sensor mentioned above. The timing of the phase locked loop clock 11 derived from track n−1 is measured relative to the reference index 10 in step 2 of FIG. 5. The difference $T_{error}(n-1)$ thus measured is arbitrarily set to zero in this example. As shown in step 3 of FIG. 5, the clock data 12 for the next track n is written with a phase advance of T(n−1) to produce the clock track 13 actually written to the track n as shown in step 4 of FIG. 5.

As described briefly with reference to FIG. 1 above, the clock data for track n is read to provide the so-called linear head signal 13 for track n and decoded into a pattern 14 of peak detected bits 15 for track n as shown in step 5 of FIG. 5. This peak detected bits pattern 14 for track n is used to derive the timing of the clock pattern 16 of the phase locked loop clock ultimately to be used for the next track n+1. Again, and in accordance with the present invention, the external reference index 10 is used to measure the timing of the phase locked loop clock pattern 16 derived from track n. The error $T_{error}(n)$ can be seen to be non-zero. This non-zero error $T_{error}(n)$ represents a small shift in the phase of the clock track and requires correcting when the next clock track for track (n+1) is actually written in order to avoid the phase advance and delay problems mentioned above.

In an example of the present invention, the phase advance required to correct the error $T_{error}(n)$ can be calculated according to the following formula:

$$T_n = T_{n-1} - 2T_{error}(n) + T_{error}(n-1) \quad 1$$

Equation 1 can be rewritten using the known Z-transform technique as used in digital control theory as:

$$T(z) = T(z) \cdot z^{-1} - 2T_{error}(z) + T_{error}(z) \cdot z^{-1} \quad 2$$

which becomes:

$$T(z) = \frac{(z^{-1} - 2)}{(1 - z^{-1})} \cdot T_{error}(z) \quad 3$$

More generally, equation 3 can be rewritten as:

$$T(z) = G(z) \cdot T_{error}(z) \quad 4$$

The generalised equation 4 can have the Z transform G(z) optimised to the specific user application to filter out unwanted noise or disturbances in the correction algorithm and achieve an adequate system response to ensure a reliable and accurate correction algorithm.

The thus modified phase advance T(n) is used to generate the write clock data 17 for the next track n+1 as shown in step 7 of FIG. 5. The clock signal 18 read back from track n+1 is shown in step 8 of FIG. 5. This clock pattern 18 for track n+1 is decoded to provide a peak detected bits pattern 19 from track n+1 as shown in step 9 of FIG. 5. The phase locked loop clock pattern 20 derived from the peak detected bits pattern 19 is shown in step 10 of FIG. 5. As can readily be seen from the drawings in FIG. 5, the phase advance error $T_{error}(n+1)$ in the phase locked loop clock pattern 20 derived from track n+1 is very much smaller than the error $T_{error}(n)$ for the previous track n shown in step 6 of FIG. 5. The use of the external timing reference index, which is preferably used to determine the phase error each time a clock pattern is written to a successive track, thus prevents the build up of cumulative errors in the clock pattern copying process and serves to ensure that the clock patterns written to the successive tracks across the disk all maintain the correct phase alignment in which the clock patterns are perfectly aligned in phase or are aligned within desired or required tolerances.

Preferably, as mentioned, the phase advance calculation and suitable adjustment based on the external timing reference index is carried out for the clock pattern data for each track. However, in some circumstances, it may not be strictly necessary to carry out this calculation and adjustment for every track and it may be sufficient to adjust the phase advance for every other track, every third track, or even less frequently. Precisely how frequently it will be necessary to adjust the phase advance will depend on the natural variability in the phase advance produced by the reading and writing system and the hard disk apparatus itself.

In a practical application of the system mentioned above, it may be that the external reference index used has some phase jitter. This may especially be the case if the external reference index is derived from such signals as the disk drive motor back emf. An indication of phase jitter is shown in (a) of FIG. 6. In this example, the occurrence of index pulses 10' has a distribution in time with a standard deviation of σ. In a preferred embodiment of the present invention, statistical measurement techniques are used to improve the certainty and hence accuracy of the external reference index 10. As is known from conventional statistical analysis, the accuracy can be improved to σ/√N where N is the number of averages used. This is indicated further in FIG. 6. In (b) of FIG. 6, there is shown a timing window 21 within which the external reference index 10' may occur with a probability p. The distribution of the indices 10' in time is indicated in (c) of FIG. 6 which is a histogram showing the probability p of the external reference index occurring at a particular time with a standard deviation in the time domain of σ. The improved distribution in time of the arrival of the reference indices 10' using the averaging scheme mentioned above is shown in (d) of FIG. 6.

It is possible, and sometimes desirable, to use several indices per disk revolution to produce a time averaged reference index. For example, this can be achieved where the disk drive motor back emf is used since, in typical hard disk drives, 24 or 36 transitions per revolution can be obtained. Thus, there are immediately available 24 or 36 transitions which can be averaged in the time domain to achieve a once-per-revolution averaged external reference index 10.

FIG. 7 shows at (a) a plurality of six such external reference transitions occurring once per revolution. Each transition can jitter as indicated at (b), but as indicated at (c) each has a nominal time of arrival of $T_1$, $T_2$, $T_3$, $T_4$, $T_5$ and $T_6$ respectively relative to some arbitrary start point, which may be a reference transition on the servo-writer phase locked loop clock. Each of $T_1$ to $T_6$ can be initialised by averaging to the required determinacy in the time domain using the phase locked loop clock.

Using each of the nominal arrival times $T_1$ to $T_6$ and measuring the instantaneous arrival times $T_1(n)$ to $T_6(n)$ as indicated at (d), the average $T_{error}(n)$ can be calculated on a once-per-revolution basis as follows:

$$T_{error}(n) = \tfrac{1}{6}\{(T_1 - T_1(n)) + (T_2 - T_2(n)) + (T_3 - T_3(n)) + (T_4 - T_4(n)) + (T_5 - T_5(n)) + (T_6 - T_6(n))\}$$

More generally, for a plurality of i such external indices:

$$T_{error}(n) = \frac{1}{i}\sum_{k=1}^{i}(T_k - T_k(n))$$

The accuracy of the external reference index can be yet further improved by statistical averaging over several clock track copying cycles. This averaging process can be incorporated into the correction algorithm in equation 4 above.

In FIG. 8, there is shown a schematic representation of apparatus according to and for carrying out the present invention. A hard disk assembly 30 includes a rotatable magnetic disk 31 which is mounted on a spindle 32 of a disk drive motor 33. A read/write head (or heads) 34 is mounted on an arm 35 which can be moved back and forth across the rotating disk 31 by a head arm actuator 36.

A computer 40 controls operation of the hard disk assembly 30. In particular, the computer 40 controls rotation of the disk 31 and movement of the read/write head(s) 34 across the surface of the disk 31 and also has general control of clock track reading and writing.

An external reference index detection circuit 41 is used to obtain the external reference index. As mentioned above, the external reference index may be obtained from the back emf generated by the disk drive motor 33; in that case, the external reference index detection circuit 41 measures the back emf from the disk drive motor 33. Alternatively or additionally, the external reference index can be obtained from a sensor such as an optical sensor which detects movement therepast of a mark such as a reflector on the surface of the disk 31 or some other sensor as mentioned above.

A phase locked loop 42 generates a phase locked loop clock signal on the basis of a signal from a clock track read circuit 43 which reads the clock track from the disk 31. The phase locked loop signal is passed to a phase measurement circuit 44 where its phase is compared to the external reference index or a number representing a delay passed to the phase measurement circuit 44 by the external index detection circuit 41.

The result of the comparison in the phase measurement circuit 44 is passed to the computer 40 which uses the result to calculate the phase advance T required for the clock pattern for each track on the disk 31 as described in detail above. The result of the calculation is passed by the computer 40 to a programmable phase adjustment circuit 45 to which is also input the phase locked loop clock signal from the phase locked loop 42. The programmable phase adjustment circuit 45 adjusts the phase of the clock signal to be written to the next track on the disk 31. The phase adjusted clock signal is then passed to a clock track write circuit 46 which writes the phase adjusted clock signal to the disk 31.

An embodiment of the present invention has been described with particular reference to the example illustrated. However, it will be appreciated that variations and modifications may be made to the example described within the scope of the present invention.

What is claimed is:

1. A method of writing clock data to a storage medium having tracks on which data are stored, the method comprising:

(A) writing clock data to a present track on the storage medium;

(B) reading said written clock data from said present track;

(C) generating clock data for a subsequent track on the storage medium from the clock data read from said present track;

(D) comparing the phase of the generated clock data for the subsequent track with a reference timing signal and adjusting the phase of the generated clock data for the subsequent track in accordance with said comparison; and, (E) writing said phase adjusted clock data for the subsequent track to said subsequent track.

2. A method according to claim 1, wherein the subsequent track is the track immediately following the present track.

3. A method according to claim 1, wherein steps (B) to (E) are repeated across the tracks on the storage medium, with the clock data read from a certain track in a step (B) being the clock data written in a step (E) for that track.

4. A method according to claim 3, wherein steps (B) to (E) are repeated for every track on the storage medium.

5. A method according to claim 1, wherein, in the comparison step (D), the phase of the generated clock data to be written to the subsequent track is adjusted by an amount which takes into account the phase adjustment used for clock data written to the present track, the phase difference between the reference timing signal and the generated clock data generated from the clock data read from the present track, and the phase difference between the reference timing signal and the generated clock data generated from the clock data read from a previous track.

6. A method according to claim 5, wherein, in the comparison step (D), the phase of the generated clock data to be written to the subsequent track n+1 is adjusted by an amount T(n) substantially equal to $(T(n-1) - 2T_{error}(n) + T_{error}(n-1))$, where $T(n-1)$ is the phase adjustment used for clock data written to the present track n, $T_{error}(n)$ is the phase difference between the reference timing signal and the generated clock data generated from the clock data read from the present track n, and $T_{error}(n-1)$ is the phase difference between the reference timing signal and the generated clock data generated from the clock data read from the previous track n−1.

7. A method according to claim 5, wherein said previous track is the track which immediately precedes the present track.

8. A method according to claim 1, wherein the storage medium is a disk.

9. A method according to claim 8, wherein the disk is a magnetic disk.

10. A method according to claim 8, wherein the disk is coupled to a motor for rotating the disk.

11. A method according to claim 10, wherein the timing reference signal is obtained from the back emf (electromotive force) of said rotating motor.

12. A method according to claim 1, wherein the timing reference signal is obtained from a probe which detects movement past the probe of an index or indices on a rotating part of a disk drive which includes a disk as a storage medium during rotation of the disk.

13. A method according to claim 12, wherein the index is an optically detectable mark on the disk and the probe is an optical sensor.

14. A method according to claim 12, wherein the probe is a non-contact inductive probe which detects movement therepast of features on a rotating part of a disk drive.

15. A method according to claim 1, wherein the timing reference signal used is a statistical average in the time domain of a plurality of such timing reference signals.

16. A method according to claim 15, wherein the average is taken over several clock track copying cycles.

17. Apparatus for writing clock data to a storage medium having tracks on which data are stored, the apparatus comprising:

writing means for writing clock data to a present track on a storage medium;

reading means for reading said written clock data from said present track;

a clock track generator for generating clock data for a subsequent track on the storage medium from the clock data read from said present track;

a phase comparator and adjuster for comparing the phase of the generated clock data for the subsequent track with a reference timing signal and adjusting the phase of the generated clock data for the subsequent track in accordance with said comparison; and, means for writing said phase adjusted clock data for the subsequent track to said subsequent track.

18. Apparatus according to claim 17, wherein the phase comparator and adjuster is arranged to adjust the phase of the generated clock data to be written to the subsequent track by an amount which takes into account the phase adjustment used for clock data written to the present track, the phase difference between the reference timing signal and the generated clock data generated from the clock data read from the present track, and the phase difference between the reference timing signal and the generated clock data generated from the clock data read from a previous track.

19. Apparatus according to claim 18, wherein the phase comparator and adjuster is arranged to adjust the phase of the generated clock data to be written to the subsequent track n+1 by an amount $T(n)$ substantially equal to $(T(n-1)-2T_{error}(n)+T_{error}(n-1))$, where $T(n-1)$ is the phase adjustment used for clock data written to the present track n, $T_{error}(n)$ is the phase difference between the reference timing signal and the generated clock data generated from the clock data read from the present track n, and $T_{error}(n-1)$ is the phase difference between the reference timing signal and the generated clock data generated from the clock data read from the previous track n−1.

20. Apparatus according to claim 1, comprising a reference timing signal generator for generating a reference timing signal.

21. Apparatus according to claim 1, including a disk storage medium.

22. Apparatus according to claim 21, wherein the disk is a magnetic disk.

23. Apparatus according to claim 21, wherein the disk is coupled to a motor for rotating the disk.

24. Apparatus according to claim 23, comprising means for providing the timing reference signal obtained from the back emf (electromotive force) of said rotating motor.

25. Apparatus according to claim 17, comprising a probe which detects movement past the probe of an index or indices on a rotating part of a disk drive which includes a disk as a storage medium during rotation of the disk for providing the timing reference signal.

26. Apparatus according to claim 25, wherein the index is an optically detectable mark on the disk and the probe is an optical sensor.

27. Apparatus according to claim 25, wherein the probe is a non-contact inductive probe for detecting movement therepast of features on a rotating part of a disk drive.

28. Apparatus according to claim 17, comprising means for providing said timing reference signal as a statistical average in the time domain of a plurality of such timing reference signals.

* * * * *